April 16, 1940.　　　J. P. TRIPP　　　2,197,281
ARC WELDING APPARATUS
Filed Jan. 10, 1938　　　4 Sheets-Sheet 2

INVENTOR
J. P. TRIPP
BY J. D. O'Connell
ATTORNEY

April 16, 1940.                J. P. TRIPP                2,197,281
                          ARC WELDING APPARATUS
                          Filed Jan. 10, 1938              4 Sheets-Sheet 4

INVENTOR.
J.P.TRIPP
BY J.D.O'Connell
ATTORNEY

Patented Apr. 16, 1940

2,197,281

UNITED STATES PATENT OFFICE 2,197,281

ARC WELDING APPARATUS

John P. Tripp, Montreal, Quebec, Canada

Application January 10, 1938, Serial No. 184,120

2 Claims. (Cl. 219—8)

This invention relates to improvements in arc welding machines used in connection with the seam welding of plates or cylindrical objects such as sheet metal pipes, tanks and the like.

It is an object of this invention to provide a compact self-contained machine by which seam welding operations, particularly the circumferential seam welding of pipes and tanks, may be easily and quickly accomplished without the assistance of overhead cranes, hoists, or other separate work lifting devices usually required for moving the pipe or tank sections through the welding process. To this end the machine is provided with floor-level work supporting and rotating apparatus of the type described and claimed in my prior U. S. Patent 2,034,451, said apparatus being arranged to support the work beneath a welding head suspended from a truck running on track rails carried by a horizontal portion of the machine frame which overlies the work supporting and rotating apparatus and is co-extensive therewith.

It is also an object of this invention to provide a machine in which the welding and control cables leading to the welding head and other electrical equipment are supported by trolleys running on track rails carried by a second horizontal portion of the machine frame which lies parallel with the portion supporting the welding head truck. This is an improvement over prior arrangements in which the cable trolleys run on wire ropes stretched between roof trusses of the building in which the welding machine is installed. An objection to the prior arrangement is that it frequently interferes with the passage of overhead cranes, in addition to offering certain difficulties in respect to tightening the trolley suspension ropes sufficiently to ensure free operation of the trolleys at all times. By arranging the trolleys on track rails carried by the machine frame it is possible to locate the trolleys well below the path of travel of the overhead cranes in addition to providing a more compact assembly of the trolleys with the other elements of the machine.

It is also an object of this invention to provide improved means for supporting the portions of the cable which extend from the last trolley to the welding head and other electrical equipment which is mounted to travel with the welding head and the welding head truck. To this end such portions of the cables are supported in suitably arranged clamps carried by a clamping frame attached to and movable with the welding head truck.

Other objects, advantages and characteristic features of the invention will be more particularly understood from the following detail description of the accompanying drawings, in which—

Figure 1:
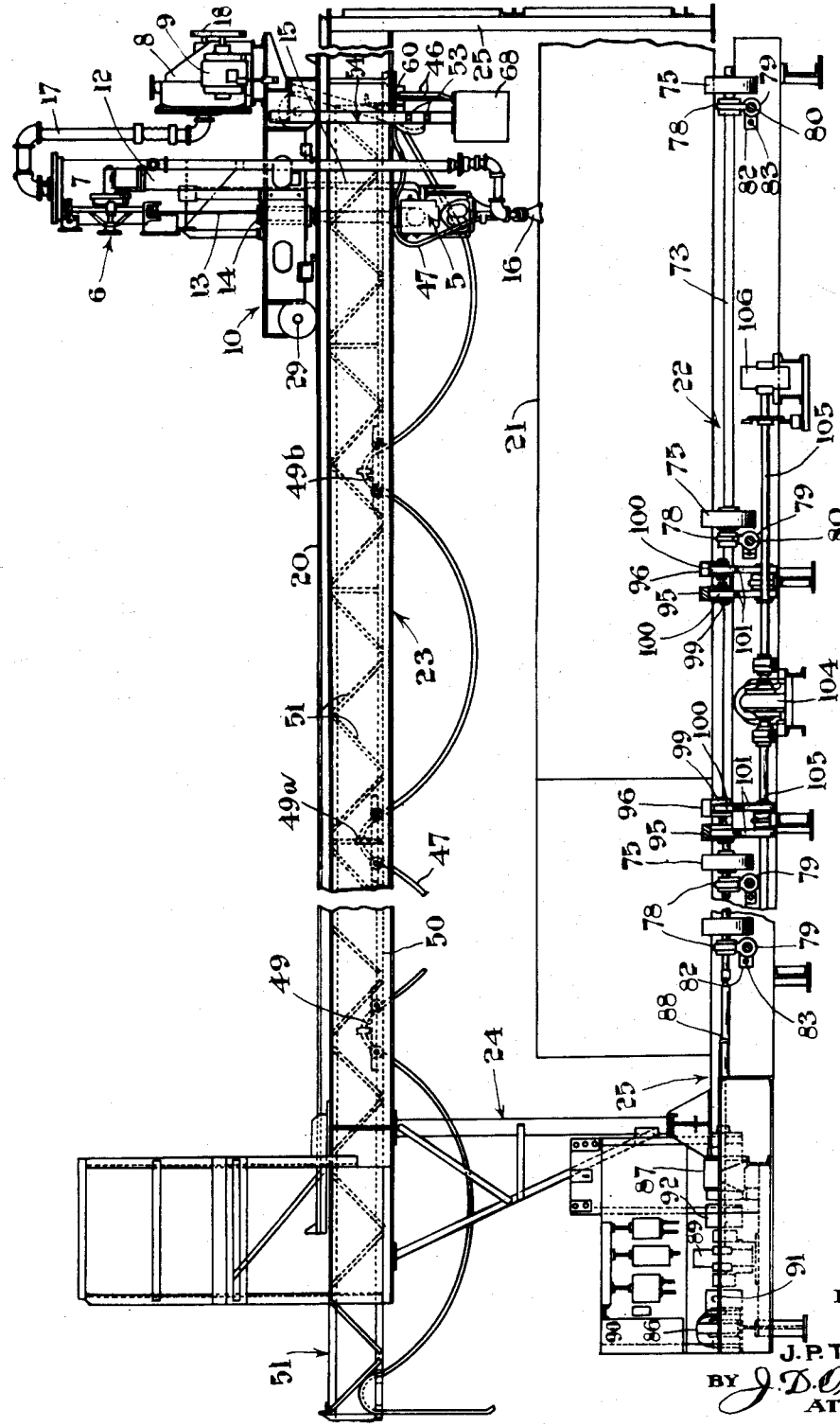
Fig. 1 is a view, partly in side elevation and partly in vertical section, of a complete welding machine installation designed in accordance with this invention.

The particular machine shown in the present drawings is designed to facilitate the circumferential welding of pipes, tanks, and other cylindrical objects by the welding process known to the trade as the "Unionmelt" process. It therefore comprises certain conventional elements which are well known in connection with the carrying out of this particular welding process. Such elements include the welding head 5, electrode reel 6, flux tank 7, centrifugal compressor 8, and compressor operating motor 9. The head 5 is suspended from a welding head truck 10 by a suitable suspension member 11. The reel 6 is mounted on a standard 12 rising from the truck 10. A bare wire electrode 13 is passed from reel 6 to the welding head 5 through an insulating guide tube 14 (Fig. 1) arranged in a vertical opening formed in one of the side frame members of the truck 10. The flux tank 7 is mounted on the truck 10 and is provided with the usual flux discharge pipe 15 (Fig. 1) through which the flux is fed to the weld through the welding head 5 in the manner characteristic of the "Unionmelt" process. According to this process part of the flux is thus fused over the weld to form a protective coat which remains until the molten steel from the electrode solidifies and cools. The surplus flux is returned to tank 7 through nozzle 16 and pipe 16a by the suction of the compressor 8 whose suction side is connected to the upper portion of tank 7 by the suction pipe 17. Suitable filter bags (not shown) are arranged in the upper portion of the tank 7 in accordance with the "Unionmelt" process to prevent the flux being drawn into the suction pipe 17 by the compressor 8. The compressor 8 is driven from the motor 9 through the agency of a suitable belt drive 18. The truck 10 is arranged to travel on overhead track rails 20 lying above and parallel with the length of the work or pipe 21 which is arranged on the floor-level work supporting and rotating apparatus generally indicated at 22. The rails 20 are mounted on laterally spaced I beams 23 supported by vertical frame structures 24 rising from the floor level 25 adjacent opposite ends of the work supporting and rotating apparatus 22. As shown to advantage in Fig. 3 the I beams 23 are spaced apart to provide an intervening space along which the welding head suspension member 11 travels as the welding head 5 and truck 10 are shifted to different circumferential seam-welding positions along the length of the work 21.

Figure 4:
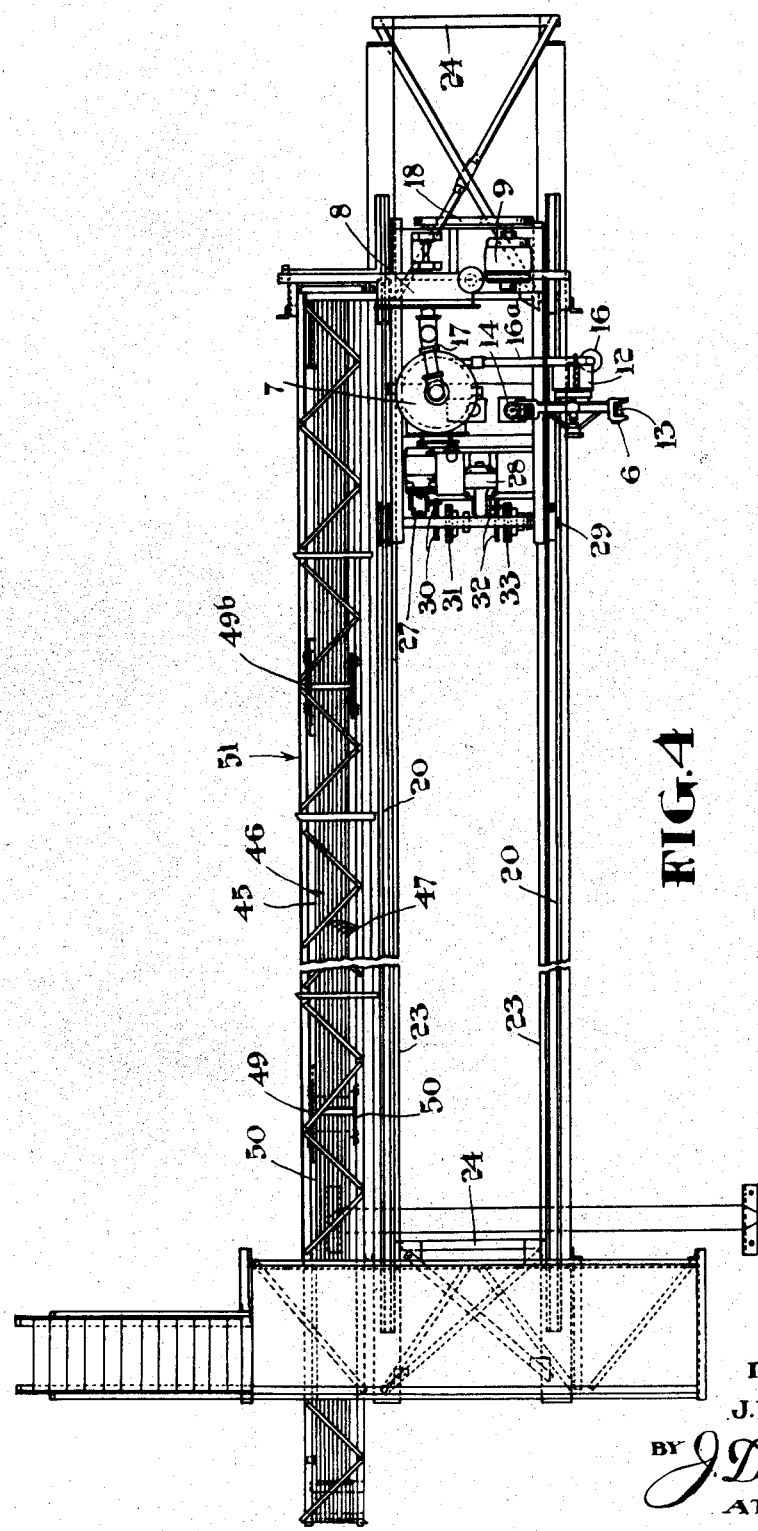
Fig. 4 is a top plan view of a portion of the assembly appearing in the preceding figures. In this view the work supporting and rotating apparatus is omitted for the sake of clearness.

The propelling mechanism of truck 10 is substantially the same as the propelling mechanism of the power driven truck embodied in the arc welding mechanism described in my prior U. S. Patent 1,991,128, dated February 12, 1935. Such mechanism comprises a rapid travel motor 26 and a slow speed travel motor 27 adapted to be used alternately for propelling the truck at different speeds, dependent on operating conditions. Motor 27 serves to drive the truck axle 29 (Fig. 4) through a suitable drive connection comprising the gearing 30 and magnetic clutch 31. Motor 28 serves to drive the same axle through a similar drive connection comprising the gearing 32 and the magnetic clutch 33. The magnetic clutches 31 and 33 are electrically interlocked as described in my prior Patent 1,991,128 or in any other suitable manner to prevent simultaneous engagement thereof. When operating current is supplied to the operating motor 28 the magnet of clutch 33 is automatically energized to establish a drive connection between motor 28 and axle 29. This motor is used to effect rapid or high speed travel of the truck 10 and welding head 5 along the track rails 20 to bring the welding head to a position of approximate alignment with the seam to be welded. By deenergizing the motor 28 and energizing the motor 27 the truck 10 and welding head 5 may then be moved at a relatively slow or creeping speed to facilitate accurate alignment of the welding head with the seam.

Figure 2:
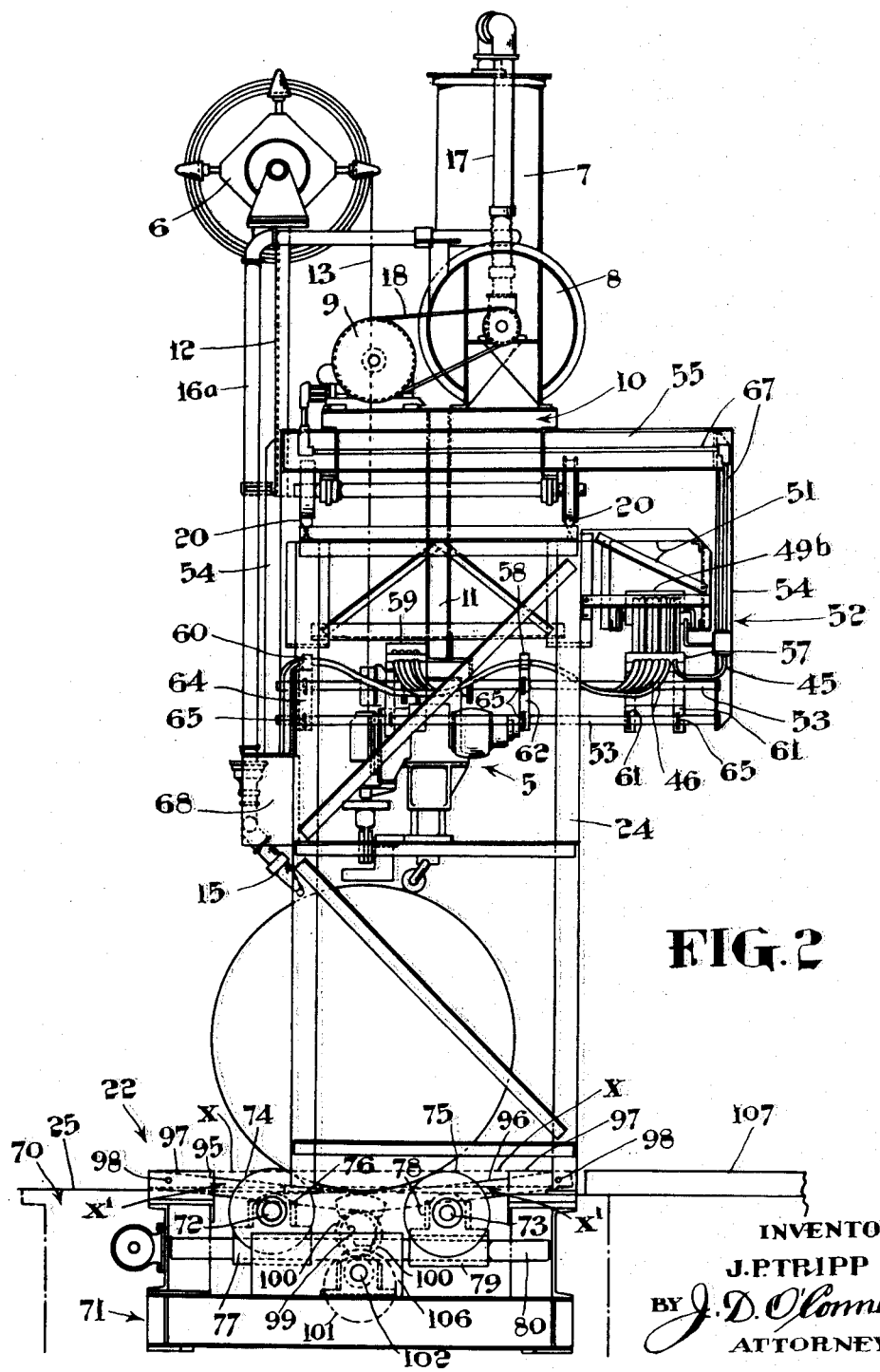
Fig. 2 is an end view looking toward the right hand end of the assembly appearing in Fig. 1.
Figure 3:
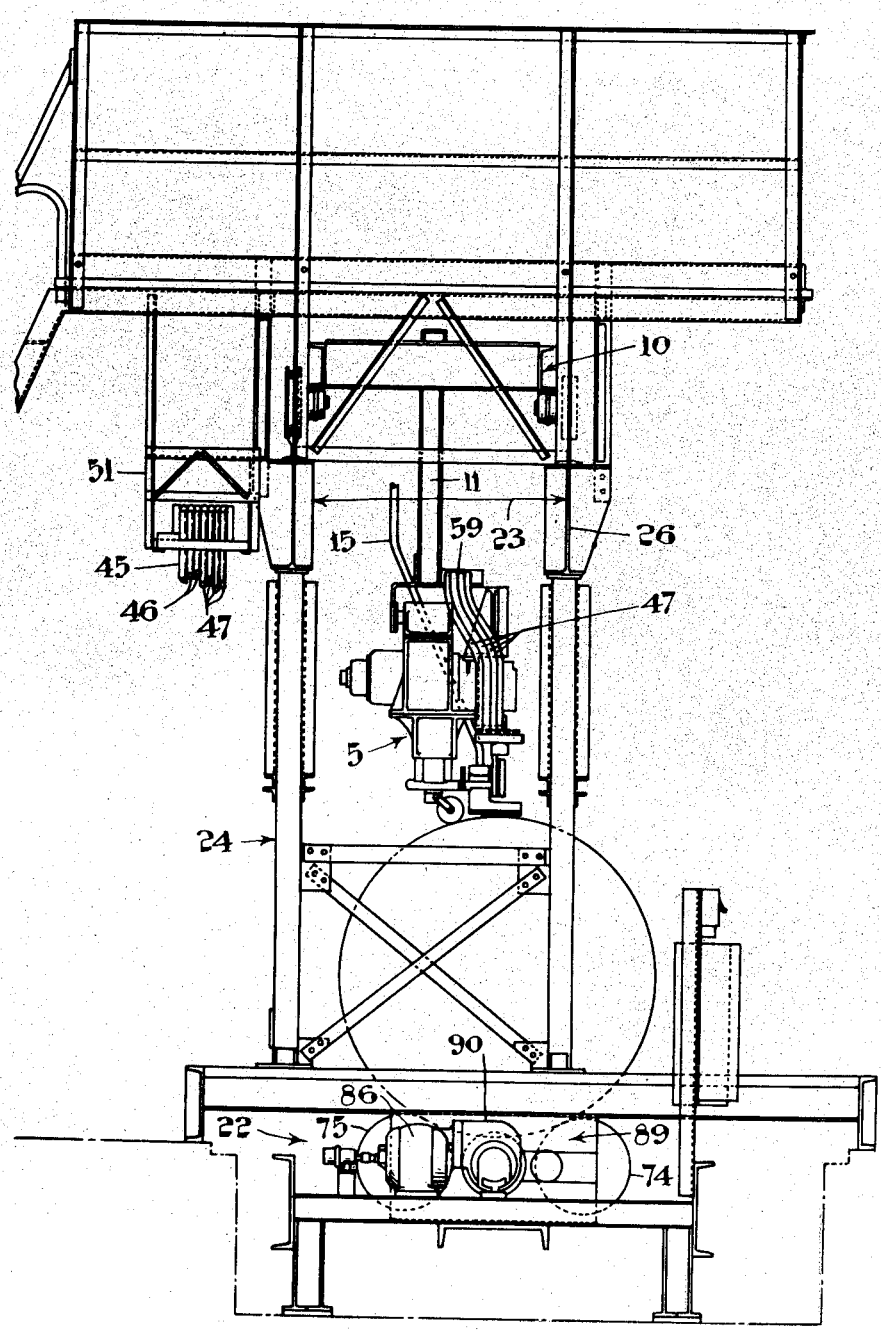
Fig. 3 is an end view looking toward the left hand end of the assembly appearing in Fig. 1. Certain parts which would ordinarily appear in this view have been omitted for the sake of clearness.

The welding and control cables leading to the welding head and electrical control equipment are indicated at 45, 46 and 47 in Figs. 1, 2 and 3. As shown more particularly in Figs. 1 and 4, these cables are looped over suitable supporting trolleys 49, 49a and 49b running on rails 50 mounted on a light, trussed runway structure 51 located at the side of one of the previously mentioned I beams 23.

The truck 10 carries a travelling cable supporting and clamping frame generally indicated at 52. This frame comprises upper and lower clamp supporting rods 53 extending between the lower portions of a pair of side frame members 54 having their upper ends rigidly secured to a cross beam 55 carried by and projecting beyond opposite sides of the truck. Suitable cable clamps 57, 58, 59 and 60 are carried by clamp brackets 61, 62, 63 and 64 which, in turn, are fastened to the rods 53 by U-bolts 65. The cable 45 supplies current to motor 9 and is passed to said truck through a rigid conduit 67 carried by the frame 52. The portion of this cable which lies between the trolley 49b and the entrance end of conduit 67 is supported by the cable clamp 57. The control cables 46 (see Fig. 2) are passed from the trolley 49b to the push button station or control box 68 through the supporting clamps 57, 58 and 60. The control box 68 is carried by member 54 of the clamping frame 52 so that it travels with the welding head 5 and truck 10. The remaining or welding cables 47 are passed from the trolley 49b to suitable contacts on the welding head 5 through the supporting clamps 57, 58 and 59.

The work supporting and rotating apparatus 22 is installed in a floor pit 70 and is constructed in accordance with my prior Patent 2,034,451, dated March 17, 1936. It comprises a suitable frame structure 71 equipped with parallel work supporting shafts 72 and 73 (Fig. 2). A series of work supporting rollers 74 are keyed to and spaced along the length of shaft 72 to lie directly opposite similar work supporting rollers 75 keyed to shaft 73. Shaft 72 is journalled in pillow blocks 76 mounted on pillow block slides 77 while shaft 73 is similarly journalled in pillow blocks 78 mounted on the pillow block slides 79. The pillow block slides 77 are directly opposed to the pillow block slides 79, the opposing slides of each pair being bored for the passage of a common guide shaft 80 extending between the side members of the frame 71. The opposing slides 77 and 79 of each pair are also provided with laterally projecting lugs 82 (see Fig. 1) through which a screw shaft 83 is threaded so that, by turning this shaft, the rollers 74 and 75 together with their carrying shafts 72 and 73 may be adjusted laterally to increase or decrease the distance between the centers of the two sets of rollers to suit the diameter of the cylindrical work 21 which is supported and rotated by the rollers during the welding operation. The several screw shafts 83 are preferably geared to a common motor driven operating shaft as described in my prior U. S. Patent 2,034,451.

Two electric motors appearing at 86 and 87 are adapted to be used alternately for driving the shafts 72 and 73. Since the driving connections between the motors 86 and 87 and the work supporting shafts 72 and 73 are made in the same manner as described in my prior U. S. Patent 2,034,451, the following brief reference is deemed sufficient for present purposes. Each of the shafts 72 and 73 is connected by a separate transmission shaft 88 to suitable gearing contained in a gear casing 89 (compare Figs. 1 and 3). A drive connection between the motor 86 and the gearing in casing 89 is established through the agency of a speed reducer 90 and a magnetic clutch 91, the latter being provided for releasably clutching the power transmission shaft of the speed reducer to the power receiving shaft of the gearing contained in casing 89. A similar magnetic clutch 92 is provided for releasably clutching the power receiving shaft of the gearing in casing 89 to the armature shaft of the motor 87. The motor 86 is a variable speed motor that is used to drive the work rotating shafts 72 and 73 at any desired speed within the range of welding speeds for which the apparatus is designed. The motor 87 is a constant speed motor that is used to drive the shafts 72 and 73 at a higher speed when it is desired to quickly rotate a part of the work to a welding position directly beneath the welding electrode.

The pipe or other cylindrical object to be welded is deposited on the rollers 74 and 75 and removed therefrom by means of two work handling bars 95 pivoted to one side of the frame 71 to cooperate with similar bars 96 pivoted to the opposite side of said frame. The inner ends of adjacent bars 95 and 96 are disposed in overlapping side by side relation while the outer ends are positioned between brackets 97 carrying pivots 98 on which the bars are mounted to swing in a vertical direction. The inner overlapping ends of the bars of each pair are provided with brackets 99 carrying rollers 100 which rest on eccentrics 101 fixed to shafts 102. The mechanism for driving shafts 102 to operate the eccentrics 101 is fully described in my prior U. S. Patent 2,034,451. Consequently, for present purposes, it is deemed sufficient to state that each of the shafts 102 is driven by motor 104 through a transmission shaft 105 and suitable gearing contained in gear casing 106.

The motor 104 is adapted to be operated as described in my prior patent so that, through the action of the eccentrics 101, the bars may be shifted from the position X to the position X' in Fig. 2, or vice versa. In the X position the bars are substantially parallel with track rails 107 along which the pipe or other cylindrical object may be conveniently shifted to a position where it rests on the overlapping portion of the two sets of bars 95 and 96. The motor 104 is then operated to rotate the eccentrics 101 to a position permitting lowering of the bars to the X' position. During this movement thereof the bars 95 and 96 serve to deposit the work on rollers 74 and 75 and then continue downwardly until they are sufficiently below the upper tread portions of the rollers 74 and 75 to clear the work. It will be understood that the work supporting and rotating apparatus described herein will, in practice, include limit switches and other necessary details which, while not specifically mentioned herein, are fully set forth in my prior U. S. Patent 2,034,451.

Having thus described my invention, what I claim is:

1. Welding apparatus comprising end frames rising from the floor level, a pair of elevated laterally spaced beams extending between and carried by said frames, rails mounted on and extending longitudinally of said beams, a welding head truck arranged to travel on said rails, a welding head assembly suspended from the truck by a suspension member working in the space between the beams, said welding head assembly being located below said beams, a cable clamping frame including vertical side members lying at opposite sides of said beams and having their upper ends secured to said truck to travel therewith, rods extending between the lower portions of said side members below said beams and cable clamps carried by said rods.

2. Welding apparatus as set forth in claim 1 including a horizontal runway structure extending along the outer side of one of said beams, track rails mounted on said runway structure and supporting trolleys mounted on said rails, said trolleys serving to support cables leading to the cable clamps carried by the aforesaid clamping frame.

JOHN P. TRIPP.